Nov. 1, 1960
J. T. DEWAN
2,958,780
METHODS AND APPARATUS FOR INVESTIGATING
EARTH FORMATIONS
Filed Oct. 29, 1956
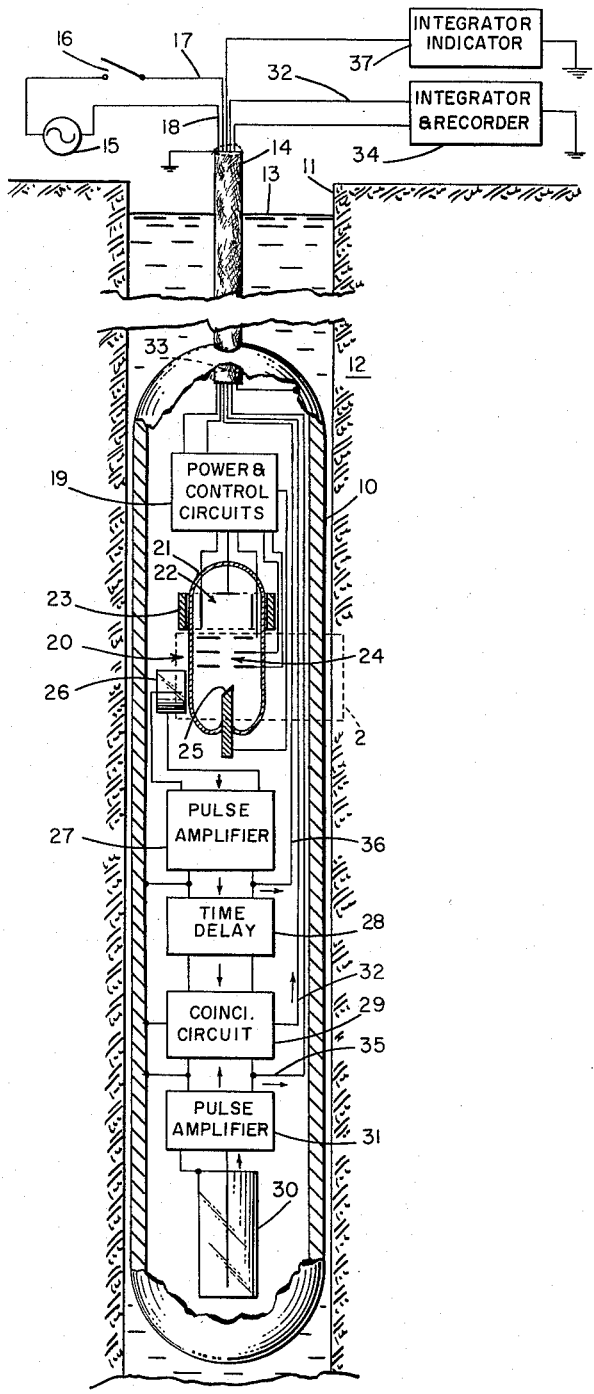
FIG.1
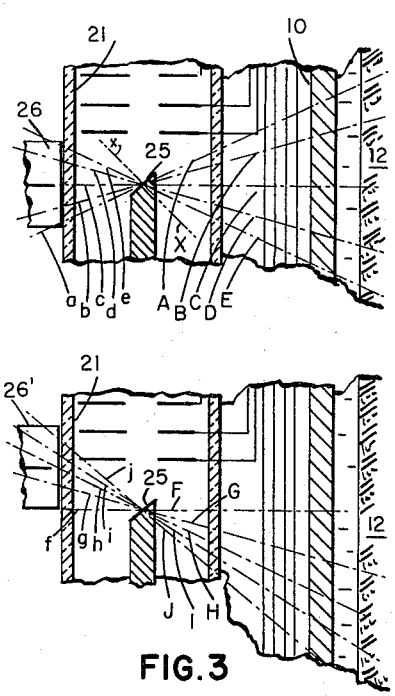
FIG.2
FIG.3
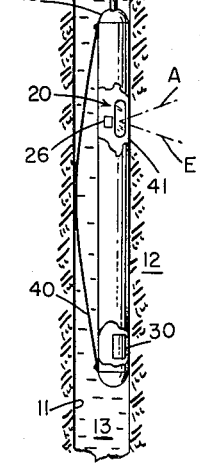
FIG.4
*INVENTOR.*
JOHN T. DEWAN
BY Robert Hochfield
HIS ATTORNEY United States Patent Office 2,958,780
Patented Nov. 1, 1960

2,958,780

METHODS AND APPARATUS FOR INVESTI-
GATING EARTH FORMATIONS

John T. Dewan, Houston, Tex., assignor, by mesne assignments, to Schlumberger Well Surveying Corporation, Houston, Tex., a corporation of Texas Filed Oct. 29, 1956, Ser. No. 618,821

11 Claims. (Cl. 250—83.3)

This invention relates to methods and apparatus for investigating earth formations traversed by a borehole and, more particularly, pertains to certain improvements in radioactivity logging apparatus of the type including a source of radiant energy adapted to be passed through the borehole and means for obtaining indications of resultant radiant energy caused by irradiation of the earth formations by the source.

As used herein, the term "radiant energy" is intended to denote either wave or particle energy; for example, gamma rays, neutrons and alpha particles are all deemed to be within the scope of this term. Thus, the expression "quantum of radiant energy" embraces a discrete quantity of wave energy as well as a single particle of particle energy.

Moreover, "resultant radiant energy" is intended to signify radiant energy emanating from a material in response to incident radiant energy. Such phenomena as the generation of gamma rays in the material as the result of bombardment by and the capture of neutrons, and the production of slowed or lower energy neutrons by elastic collisions of incident neutrons with particles of the material are considered to be exemplary of the last-quoted expression.

Earth formations have been logged heretofore using a source of neutrons and a detector of radiant energy resulting from irradiation of the formations by neutrons. Since neutrons carry no electrical charge and are relatively highly penetrative neutrons emitted from within the relatively confined space of a borehole cannot be readily influenced so to permit the investigation of a limited zone of the formations. Were this possible, borehole size effects may be reduced, resolution of the measured parameter may be increased and the depth of investigation may be increased.

It is, therefore, an object of the present invention to provide new and improved methods and apparatus for investigating earth formations by irradiation with radiant energy for effectively examining a limited zone within the formations.

Another object of the present invention is to provide new and improved neutron logging methods and apparatus providing indications substantially only in response to irradiation of a zone within the formations of relatively limited extent.

Yet another object of the present invention is to provide new and improved methods and apparatus for investigating earth formations traversed by a borehole wherein neutrons are emitted from within the borehole and indications of resultant radiant energy are obtained effectively providing information as if the neutrons were emitted in a highly localized beam.

In accordance with the present invention, earth formations traversed by a borehole are investigated by establishing in the borehole reactions providing radiant energy of one type, wherein each quantum is accompanied by a quantum of radiant energy of another type. Radiant energy of the one type irradiates the earth formations to produce resultant radiant energy. Indications are obtained substantially only in response to quanta of the resultant radiant energy having a predetermined timing relation to individual quanta of radiant energy of the other type.

Also within the contemplation of the present invention is apparatus for investigating earth formations traversed by a borehole comprising a support adapted to be passed through the borehole. A source of radiant energy of one type is carried by the support and irradiates the earth formations to produce resultant radiant energy. Each quanta of radiant energy of the one type emitted by the source is accompanied by the emission of a quantum of radiant energy of another type. Radiant energy responsive means carried by the support provides one signal in response to the resultant radiant energy and another signal in response to radiant energy of the other type. The apparatus further comprises means coupled to the radiant energy responsive means for utilizing the aforesaid signals to derive indications representing quanta of resultant radiant energy having a predetermined timing relation to individual quanta of radiant energy of the other type.

The novel features of the present invention are set forth with particularity in the appended claims. The present invention, both as to its organization and manner of operation, together with further objects and advantages thereof, may best be understood by reference to the following description taken in conjunction with the accompanying drawing in which:

Fig. 1 is a view in longitudinal cross section of apparatus for investigating earth formations traversed by a borehole constructed in accordance with the present invention;

Fig. 2 is an enlarged representation of a portion of the apparatus illustrated in Fig. 1 enclosed by broken line 2;

Fig. 3 is a view similar to that shown in Fig. 2, but illustrates a modification which may be made to the apparatus there shown; and Fig. 4 illustrates a modification which may be made to the apparatus shown in Fig. 1.

As shown in Fig. 1 of the drawing, apparatus embodying the present invention comprises a pressure resistant housing 10 adapted to pass through a borehole 11 traversing earth formations 12. Borehole 11 usually contains hydrogeneous drilling fluid 13, such as a water base or oil base mud, or it may be dry.

Housing 10 is suspended in the borehole by means of an armoured cable 14 which, in connection with a winch (not shown) located at the surface of the earth, may be employed to lower and raise the housing in the borehole in a customary manner.

A source of electrical energy 15 at the surface of the earth is provided with an operating switch 16 and is connected by electrically insulated conductors 17 and 18 of cable 14 to a power and control circuit 19 within housing 10 operatively connected to a neutron source 20 also supported within the housing. Source 20 may be constructed in any of a variety of ways and, for example, may be similar to the devices disclosed in either of copending applications Serial No. 275,932 filed March 11, 1952 in the name of Clark Goodman or Serial No. 414,761 filed March 8, 1954, now U.S. Patent No. 2,914,677, issued November 24, 1959, in the name of Wayne R. Arnold, both of which are assigned to the present assignee. In accordance with the Arnold application, neutron source 20 comprises a sealed envelope 21 filled with an ionizable gas, such as an isotope of hydrogen known as deuterium. Envelope 21 encloses electrodes of an ion source 22 energized by power circuit 19 and the envelope is enclosed by a cylindrical magnet 23 operatively associated with the electrodes. Deuterium ions derived by source 22 pass into an accelerating gap 24 energized by power circuit 19 and are thus accelerated toward a target 25 loaded with another isotope of hydrogen known as tritium. Thus, through the resulting nuclear reactions, neutrons at an energy of 14 million electron volts (m.e.v.) are derived. If, however, neutrons at approximately 3.5 m.e.v. are desired, target 25 may be provided with deuterium instead of tritium.

As is well known, in the reaction between accelerated deuterium ions and tritium at target 25, for each fast neutron produced there is an alpha particle ($H_e^4$ nucleus) also produced. This particle recoils in the opposite direction to the direction of travel of the neutron. Some of these alpha particles are intercepted by a radiant energy detector 26 supported within housing 10 to one side of envelope 21 and symmetrically positioned relative to a horizontal plane lying in the center of the upper surface of target 25 at which the aforesaid nuclear reactions occur. Detector 26 may, for example, be a conventional proportional counter providing output pulses supplied to a pulse amplifier 27, in turn, coupled to a time delay network 28. The delay network introduces a predetermined time delay selected in a manner to be apparent from a discussion to follow and it is coupled to one input circuit of a conventional coincidence circuit 29.

Neutrons from source 20 irradiate earth formations 12 and may produce resultant radiant energy, for example, in the form of gamma rays as a result of inelastic scattering of fast neutrons or the capture of neutrons which have been slowed to low energies. Some of this gamma radiation impinges upon another radiant energy detector 30 supported within housing 10 at its lower end. Detector 30 may, for example, be a conventional Geiger counter and it is coupled to a pulse amplifier 31 which feeds another input circuit of coincidence circuit 29. The output circuit of coincidence circuit 29 is connected to an insulated conductor 32 of cable 14 and to housing 10 which is connected to shield 33 of the cable. An integrator and recorder unit 34 located at the surface of the earth is connected to conductor 32 and by appropriate grounds to shield 33. Unit 34 may, for example, comprise a capacitor for deriving a potential representing the number of incoming pulses per unit time and a recording voltmeter to which this potential is applied. The recording medium in the voltmeter is displaced in proportion to movement of housing 10 through the borehole 11 so that a continuous log may be obtained in a customary manner.

The output of pulse amplifier 31 is supplied via an insulated conductor 35 of cable 14 and appropriate ground connections to another portion of integrator and recorder unit 34 while the output of amplifier 27 is coupled via insulated conductor 36 and ground connections to an integrator-indicator 37 at the surface of the earth.

In operation, housing 10 is passed through borehole 11 with switch 16 closed and source 20 energized so that nuclear reactions are established in the borehole at target 25 to provide radiant energy of one type, namely neutrons. Each quantum of such radiant energy, i.e., each neutron, is accompanied by the emission of a quantum of radiant energy of another type. Specifically, each neutron is accompanied by the emission of an alpha particle traveling in the opposite direction. Neutrons having trajectories in a vertical plane such as the ones designated A, B, C, D and E travel from target 25, pass through envelope 21 and housing 10 and enter earth formations 12. For each such neutron, a corresponding alpha particle passes along a respective one of trajectories a, b, c, d and e.

As can be seen, alpha particles on these trajectories are incident on detector 26. Neutrons in the vertical plane represented in Fig. 2, lying outside of the boundaries designated by trajectories A and E, are accompanied by alpha particles which are not incident on detector 26. For example, a neutron along trajectory X has a corresponding alpha particle on path x which does not pass into the detector. Obviously, assuming cylindrical symmetry of detector 26, the conditions depicted in Fig. 2 relative to a vertical plane are also representative of the occurrences in a horizontal plane through the upper surface of target 25.

A neutron leaving target 25, for example along trajectory C, enters earth formations 12 and may be either inelastically scattered or slowed and captured to produce a gamma ray quantum. Such a quantum of gamma radiation may impinge upon detector 30 producing a pulse which after amplification in amplifier 31 is applied to coincidence circuit 29. At the same time the neutron, just discussed, leaves target 25, an alpha particle on trajectory c passes into detector 26 and a correspondingly timed pulse is generated and fed to amplifier 27. After amplification, this pulse is applied to time delay circuit 28 which is adjusted to provide a predetermined time delay such that the delayed pulse enters coincidence circuit 29 at the same time the pulse due to the gamma ray quantum arrives. Under such a condition of coincidence, a pulse is supplied by circuit 29 to integrator and recorder unit 34 at the surface of the earth.

It is evident that since the coincidence circuit supplies pulses only in response to coincidences of the type just described, the pulses at lead 32 are representative of gamma ray quanta due to neutrons having trajectories within the conical zone defined by the trajectories A and E in Fig. 2. From these pulses a voltage is derived having an amplitude representing the time of occurrence thereof and a recording is made of this voltage in a continuous fashion as the housing 10 passes through the borehole.

It is therefore evident that by accepting only coincident events, a log is obtained of the effects due to neutrons which have left target 25 in a direction opposite to the alpha detector 26. This is similar in effect to providing a directional neutron source.

Coincidence circuit 29 may be set to provide a coincidence resolving time longer than the neutron slowing down and capture time in formations 12, and this may be of the order of several hundred microseconds. Of course, time delay device 28 may be arranged so that it is continuously adjustable so that it may be adjusted empirically to achieve a desired mode of operation.

Since pulses from amplifier 31 are also fed to the integrator and recording unit 34, an additional log is made of essentially all the gamma radiation incident on detector 30. This, of course, is representative of neutron irradiation of the formations 12 without the directional effects described above. Accordingly, such record provides an indication of hydrogen content of the formations in a known manner.

Pulses from amplifier 27 are supplied to unit 37 which derives a voltage representing the time rate of occurrence of such pulses. This voltage may be displayed directly on a meter thereby providing a constant visual monitor for the alpha particle output of source 20. Thus, indications are provided which are representative of neutron flux emitted by the source 20. If desired, a recorder may be employed, or the voltage developed may be supplied to the recorder of unit 34 so that a continuous record of the neutron flux may be obtained as housing 10 passes through borehole 11.

From the foregoing discussion, it is evident that the pulse output of the coincidence circuit 29 is representative of neutrons which pass horizontally into the formation through a minimum of borehole fluid 13. Alternatively, the apparatus may be arranged as shown in Fig. 3 so that the neutrons in a zone of interest pass in a slightly downwardly-directed beam. Accordingly, a detector 26' is disposed in the vicinity of target 25 but is slightly above it so that neutrons which pass along trajectories such as the ones designated F—J are accompanied by alpha particles extending along trajectories f—j to define a given zone in the borehole. This zone lies in a plane disposed at an angle to the longitudinal axis of the borehole while intercepting the location at which nuclear reactions occur at target 25.

In the embodiment of the invention illustrated in Fig. 4, housing 10' is provided with a bowed spring 40 for urging a portion or face 41 of the housing into relatively close association with the sidewall of borehole 11. Radiant energy detector 30 preferably is disposed in the housing closely adjacent to the inner surface of face 41 while alpha particle detector 26 is disposed within the housing substantially at the level of neutron source and to one side thereof opposite portion 41 of the housing 10'. In this way, neutrons emanating from source 20 within the cone defined by trajectories A—E pass directly into earth formations 12 and are substantially unaffected by the drilling liquid 13. Thus, borehole size effects are minimized.

Although detector 30 has been described as being responsive to incident gamma radiation, it may be arranged in a known manner to respond either to fast or slow neutrons. Moreover, it may be any of a variety of types other than a Geiger-Mueller counter. For example, it may be either a proportional or scintillation counter arranged to respond to the desired radiant energy. Detector 26 likewise may take any of various known forms.

Obviously, pulse amplifiers 27 and 31 may be followed by conventional pulse-height discriminators and/or additional stages of amplification as may be required.

It is also within the contemplation of the present invention to provide a coincidence arrangement of the type described above for sources of other types of radiant energy. For example, in the apparatus of Fig. 1 a source of radiant energy, such as antimony of atomic weight 124, may be used in place of source 20. In the reactions occurring within the modified source, gamma rays are emitted for irradiating the formations 12 and detector 30 is made responsive to gamma rays returning toward housing 10. Detector 26 is arranged to respond to beta rays which are also emitted by antimony 124. For example, a scintillation counter having a relatively thin scintillator may be employed, so as to be responsive to beta rays, but ont to gamma rays. The angular distribution of gamma and beta rays emitted by the source is such that for each beta ray incident on the detector 26, there is a great probability that a gamma ray is simultaneously emitted in either of two zones extending from the source toward this detector and from the source away from this detector. Consequently, by appropriately adjusting time delay circuit 28, pulses representing substantially only those gamma rays at detector 30 resulting from gamma rays in the aforesaid zones are supplied by coincidence circuit 32 to integrator-recorder 34.

Alternatively, source 20 may be arranged so that protons are accelerated toward a target composed of fluorine of atomic weight 19 to produce a reaction in which oxygen of atomic weight 16, an alpha particle and a gamma ray are produced. In this case, detector 26 responds to alpha particles while detector 30 is gamma ray responsive.

If desired, pulse-height selective circuits may be used in association with either of detectors 26 or 30 where, for example, the angular distribution of the two types of radiant energy emitted by source 20 has a dependence on the energy of the emitted radiation. This may be especially useful where the source emits radiant energy of one form, but at two different energies having a preferred angular correlation. Thus, the expresion "radiant energy of different types" is intended to denote one form of radiant energy having quanta at different energies but exhibiting such a correlation.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A method of investigating earth formations traversed by a borehole which comprises the steps of: establishing in the borehole in close proximity to a side wall portion thereof nuclear reactions to provide radiant energy of one type, for irradiating the earth formations to produce resultant radiant energy, each quantum of radiant energy of said one type being accompanied by the emission of an oppositely-directed quantum of radiant energy of another type; deriving a first electrical signal in response to said resultant radiant energy; deriving a second electrical signal in response to radiant energy of said other type emanating from said source in a direction opposite the aforesaid side wall portion of the borehole and obtaining indications substantially only in response to portions of said first electrical signal representing quanta of said resultant radiant energy having a predetermined timing relation to portions of said second electrical signal representing individual quanta of radiant energy of said other type.

2. A method of investigating earth formations traversed by a borehole which comprises the steps of: establishing in the borehole nuclear reactions to provide radiant energy of one type for irradiating the earth formations to produce resultant radiant energy, each quantum of radiant energy of said one type being accompanied by the emission of an oppositely-directed quantum of radiant energy of another type; deriving a first signal in response to said resultant radiant energy and a second signal in response to said radiant energy of said other type and obtaining indications substantially only in response to portions of said first signal representing quanta of said resultant radiant energy having a predetermined timing relation to portions of said second signal representing individual quanta of radiant energy of said other type passing through a selected zone in the borehole.

3. A method of investigating earth formations traversed by a borehole which comprises the steps of: establishing in the borehole nuclear reactions to provide radiant energy of one type for irradiating the earth formations to produce resultant radiant energy, each quantum of said one type being accompanied by the emission of a quantum of radiant energy of another type; deriving a first electrical signal in response to said resultant radiant energy; deriving a second electrical signal in response to radiant energy of said other type passing a zone in the borehole in a horizontal plane intercepting the location of said nuclear reaction; and obtaining indications substantially only in response to portions of said first electrical signal representing quanta of said resultant radiant energy having a predetermined timing relation to portions of said second electrical signal representing individual quanta of radiant energy of said other type.

4. A method of investigating earth formations traversed by a borehole which comprises the steps of: establishing in the borehole nuclear reactions to provide radiant energy of one type for irradiating the earth formations to produce resultant radiant energy, each quantum of said one type being accompanied by the emission of a quantum of radiant energy of another type; deriving a first electrical signal in response to said resultant radiant energy; deriving a second electrical signal in response to radiant energy of said other type passing a zone in the borehole in a plane disposed at an angle to the longitudinal axis of the borehole and intercepting the location of said nuclear reactions; and obtaining indications substantially only in response to portions of said first electrical signal representing quanta of said resultant radiant energy having a predetermined timing relation to portions of said second electrical signal representing individual quanta of radiant energy of said other type.

5. Apparatus for investigating earth formations traversed by a borehole comprising: a support adapted to be passed through the borehole; a source of radiant energy of one type carried by said support for irradiating the earth formations to produce resultant radiant energy, each quanta of radiant energy of said one type emitted by said source being accompanied by the emission of a quanta of radiant energy of another type; radiant energy responsive means carried by said support and providing one signal in response to said resultant radiant energy, and another signal in response to radiant energy of said other type; and means coupled to said radiant energy responsive means for deriving indications substantially only in response to portions of said one and said other signals having a predetermined timing relation to one another thereby to depict quanta of said resultant radiant energy having a predetermined timing relation to individual quanta of radiant energy of said other type.

6. Apparatus for investigating earth formations traversed by a borehole comprising: a support adapted to be passed through the borehole; a source of radiant energy of one type carried by said support for irradiating the earth formations to produce resultant radiant energy, each quanta of radiant energy of said one type emitted by said source being accompanied by the emission of a quanta of radiant energy of another type; a first radiant energy detector carried by said support and providing one signal in response to said resultant radiant energy; a second radiant energy detector carried by said support in the vicinity of said source and providing another signal in response to radiant energy of said other type; and means coupled to said first and second radiant energy detectors for deriving indications substantially only in response to portions of said one and said other signals having a predetermined timing relation to one another thereby to depict quanta of said resultant radiant energy having a predetermined timing relation to individual quanta of radiant energy of said other type.

7. Apparatus for investigating earth formations traversed by a borehole comprising: a support adapted to be passed through the borehole; a source of radiant energy of one type carried by said support for irradiating the earth formations to produce resultant radiant energy, each quanta of radiant energy of said one type emitted by said source being accompanied by the emission of a quanta of radiant energy of another type; a first radiant energy detector carried by said support and providing one pulse-type signal in response to said resultant radiant energy; a second radiant energy detector carried by said support in the vicinity of said source and providing another pulse-type signal in response to radiant energy of said other type; time delay means coupled to said second detector for introducing a predetermined time delay in the pulses of said other signal; pulse-coincidence means having an input circuit coupled to said first radiant energy detector, having an input circuit coupled to said time delay means, and having an output circuit providing an output signal representing substantially only timed-coincident portions of said one and said other pulse-type signals; and means coupled to said output circuit of said pulse-coincidence means and responsive to said output signal thereof for deriving indications representing quanta of said resultant radiant energy having a timing relation to individual quanta of radiant energy of said other type dependent upon said predetermined time delay.

8. Apparatus for investigating earth formations traversed by a borehole comprising: a support adapted to be passed through the borehole; means for urging a portion of said support into relatively close association with the sidewall of the borehole; a source of radiant energy of one type carried by said support adjacent said portion thereof for irradiating the earth formations to produce resultant radiant energy, each quanta of radiant energy of said one type emitted by said source being accompanied by the emission of a quanta of radiant energy of another type; a first radiant energy detector carried by said support and providing one signal in response to said resultant radiant energy; a second radiant energy detector carried by said support, disposed substantially at the level of said source and to one side thereof opposite said portion of said support, and providing another signal in response to radiant energy of said other type; and means coupled to said first and second radiant energy detectors for obtaining indications substantially only in response to portions of said one and said other signals having a selected timing relation to one another thereby to depict quanta of said resultant radiant energy having a predetermined timing relation to individual quanta of radiant energy of said other type.

9. Apparatus for investigating earth formations traversed by a borehole comprising: a support adapted to be passed through the borehole; a source of neutrons carried by said support for irradiating the earth formations to produce resultant radiant energy, said source of neutrons including an envelope containing an isotope of hydrogen, a target having an isotope of hydrogen, and means for deriving ions of the hydrogen contained by said envelope and for accelerating such ions toward said target thereby to produce nuclear reactions resulting in the emission of neutrons, each accompanied by the emission of an alpha particle; radiant energy responsive means carried by said support and providing one signal in response to said resultant radiant energy, and another signal in response to said alpha particles; and means coupled to said radiant energy responsive means for obtaining indications substantially only in response to portions of said one and said other signals having a selected timing relation to one another thereby to depict quanta of said resultant radiant energy having a predetermined timing relation to individual alpha particles.

10. Apparatus for investigating earth formations traversed by a borehole comprising: a support adapted to be passed through the borehole; a source of radiant energy of one type carried by said support for irradiating the earth formations to produce resultant radiant energy, each quanta of radiant energy of said one type emitted by said source being accompanied by the emission of a quanta of radiant energy of another type; radiant energy responsive means carried by said support and providing one signal in response to said resultant radiant energy, and another signal in response to radiant energy of said other type; and means coupled to said radiant energy responsive means for obtaining indications substantially only in response to portions of said one of said other signals having a selected timing relation to one another thereby to depict quanta of said resultant radiant energy having a predetermined timing relation to individual quanta of radiant energy of said other type, and for utilizing said other signal to provide indications representative of the emitted flux of radiant energy of said one type.

11. A method of investigating earth formations traversed by a borehole which comprises the steps of: passing through the borehole a source emitting radiant energy into said borehole in a plurality of directions to produce resultant radiant energy in the earth formations; said emitted radiant energy including radiant energy of a type wherein quanta are emitted substantially simultaneously in different correlated directions; deriving a first signal in response to said resultant radiant energy and a second signal in response to radiant energy from said source; and obtaining indications substantially only in response to portions of said first and said second signals having a selected timing relation to one another whereby such indications represent resultant radiant energy emanating substantially only from material within a predetermined zone extending in a given direction from said source.

References Cited in the file of this patent

UNITED STATES PATENTS

| | | |
|---|---|---|
| 2,644,891 | Herzog | July 7, 1953 |
| 2,692,949 | MacKnight | Oct. 26, 1954 |
| 2,712,081 | Fearon et al. | June 28, 1955 |
| 2,761,977 | McKay | Sept. 4, 1956 |
| 2,778,950 | Frei et al. | Jan. 22, 1957 |
| 2,785,315 | Goodman | Mar. 12, 1957 |

FOREIGN PATENTS

| | | |
|---|---|---|
| 724,441 | Great Britain | Feb. 23, 1955 |